May 15, 1956     O. TÖPPEL     2,745,796
METHOD OF RECOVERING VANILLIN
Filed Oct. 20, 1954
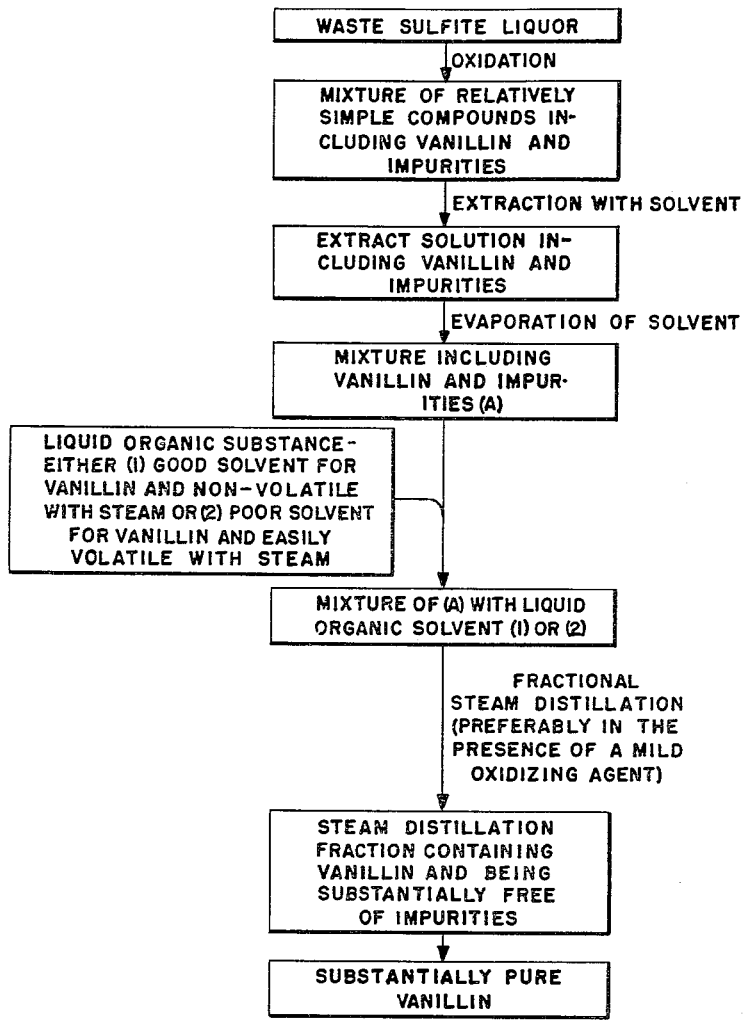
INVENTOR.
Otmar Töppel
BY by:
Michael S. Striker
agt.

United States Patent Office 2,745,796
Patented May 15, 1956

2,745,796

METHOD OF RECOVERING VANILLIN

Otmar Töppel, Aschaffenburg, Germany, assignor to Aschaffenburger Zellstoffwerke Aktiengesellschaft, Aschaffenburg, Germany Application October 20, 1954, Serial No. 463,599

Claims priority, application Germany October 21, 1953

15 Claims. (Cl. 202—46)

The present invention relates to methods of recovering vanillin from mixtures of closely related compounds containing the same and more particularly to the recovery of vanillin from residues of extract solutions obtained from waste sulfite liquors or the like.

Various processes are known for converting fermented or non-fermented waste sulfite liquors or the like into a reaction mixture of simple compounds. Many of these processes are carried out with the simultaneous recovery of by-products such as tanning substances, reducing agent liquids, and the like. The processes are carried out chiefly by the use of gaseous, liquid or solid oxidizing agents, preferably in alkaline aqueous solution, in some cases with the application of pressure and also with the addition of special catalysts.

The reaction mixture of simple compounds produced by the treatment of waste sulfite liquors or the like is composed of substances of predominantly phenolic, aldehydic or ketonic character. Vanillin is the most outstanding representative of this group and is one of the most important of the reaction products. However, the recovery of the vanillin in pure form and in good yield has been extremely difficult and no process prior to the present invention has been wholly satisfactory in the recovery of the vanillin.

All of the processes work according to one common principle. The above mentioned reaction mixture is extracted from the reaction liquid by various solvents. The extracted substances contained in the extract solution are then recovered by various means, e. g. by evaporation, by extraction with an aqueous bisulfite solution, etc.

When recovering the extractives from the extract solution by evaporation, a mass remains which ranges in color from light brown to black depending upon the reaction conditions, the nature of the raw materials, the choice of solvent used, and the pH value during the extraction process. This mass contains at most, for example when using a spruce wood waste sulfite liquor derived from strong pulp digestions, up to 85% vanillin. In practice, however, the vanillin content of the reaction products obtained is much lower. One of the reasons is that the pulping process can always be adjusted to the properties desired of the main product, pulp, but not to the optimum composition of the resulting waste sulfite liquors for conversion into vanillin.

The present invention is concerned with the isolation of the vanillin in completely pure state in a simple, inexpensive and efficient manner from the residue of extractives obtained by evaporation of the solvent from the solution obtained by extraction of the above mentioned reaction mixture with a solvent. This residue of extractives consists of a mixture of compounds which, although different, are closely related to their chemical constitution so that great difficulties are present in the separation of the residue into individual compounds.

One of the known methods for recovery of vanillin from such residue comprises purification by formation of the bisulfite compound of the vanillin. In addition, crystallization or distillation has been suggested. Purification by way of the bisulfite compound has recently come to the fore.

All of the known processes exhibit various disadvantages. In the case of purification by way of the bisulfite compound, the relatively high solubility product of the precipitates to be filtered off is of primary significance. In order to avoid intolerably high material losses this compels the working-up of the mother liquors. The vanillin obtained after decomposition of the bisulfite compounds still contains a quantity of impurities which cannot be removed to a sufficient extent by distillation or recrystallization. These, incidentally, cause an increasing reddish coloration of the preparations on standing. They must also be held responsible for the penetrating smell and by-taste of the substances which are otherwise pure at melting-point.

On an industrial scale purification by distillation or sublimation is only possible with charges which are intolerably small economically, owing to apparatus difficulties and to the sensitivity of the vanillin. The processes already mentioned recommend vacuum distillation at 2 to at most 15 mm. mercury pressure with built-in stirring means in the distillation vessel and the possibility of continuous supply for a distillation aid. The distillation temperature may not exceed 165° C. In this process resinification of the non-volatile fractions can hardly be avoided. Through this phenomenon the working-up of the non-volatile constituents and also the cleaning of the parts of the apparatus are rendered very difficult. According to descriptions of methods above mentioned the distillates obtained must also be recrystallized several times from various solvents, until an unobjectionable product can be recovered.

To sum up, it may be said that, apart from the disadvantages described, the methods of purification hitherto known demand great expenditure in apparatus, chemicals, manpower, etc., without attaining the quality of natural vanillin or that produced by fully synthetic means.

It is therefore a primary object of the present invention to provide a method of recovering substantially pure vanillin from the residues obtained upon evaporation of extract solutions containing vanillin and other substances by a method which avoids all of the above enumerated difficulties of the known methods.

It is another object of the present invention to provide a method of recovering substantially pure vanillin in high yield in an inexpensive and easily controllable manner.

Other objects and advantages of the present invention will be apparent from a further reading of the specification and of the appended claims.

With the above objects in view, the present invention mainly consists in a process of obtaining vanillin from a mass containing the same and also containing impurities, comprising the steps of steam distilling a mixture comprising the mass containing vanillin and a liquid organic substance having a predetermined volatility value and a predetermined dissolving ability value for vanillin, one of the predetermined values being very low and the other of the predetermined values being very high, whereby a steam distillation fraction containing vanillin and being substantially free of impurities is formed, and recovering the vanillin-containing fraction.

The steam distillation is preferably carried out in the presence of a mild oxidizing agent which has the effect of oxidizing the small quantities of impurities of the vanillin which are volatile with steam, the oxidation of these impurities so converting the same that they do not appear in the temperature range in which the vanillin passes over during the fractional steam distillation.

The liquid organic substance which is mixed with the extractives residue prior to fractional hot steam distillation thereof should be either a good solvent for the vanillin and non-volatile with the steam, or it should be a poor solvent for the vanillin or have no dissolving action on the vanillin and be easily volatile with the steam. The addition of such liquid organic substances to the extractive residue according to the present invention is the feature which makes the fractional steam distillation of the residue practicable. Without such addition the fractional steam distillation would be unsuitable for the recovery of the vanillin either because the yield would be too low owing to the formation of lumps or incrustations with inclusions of vanillin in the distillation vessel, or the quality of the product obtained would be too low, or the substances in the residue which are non-volatile with steam would render the cleaning of the apparatus extremely difficult owing to resinification phenomena and even greatly hinder the fractional steam distillation owing to foam phenomena.

The use of the liquid organic substances during the fractional steam distillation according to the present invention has the effect of holding the remaining non-volatile constituents of the residue in solution or suspension. Resinification of these relatively reactive substances, and likewise a fall in the vanillin yield contingent thereupon, is avoided. The reaction vessels are easily cleaned by rinsing out with hot water or dilute caustic soda solution. As previously stated, the mild oxidizing agents prevent impurities which are volatile with the steam from appearing in the temperature range in which the vanillin passes over.

As suitable solvents for the vanillin which are practically non-volatile with the steam may be mentioned substances having boiling points of greater than 300° C. at 760 mm. Hg of pressure e. g. triphenyl methane, azeneaphlene, and the like, as well as industrial oils having high boiling points, e. g. a boiling point of greater than 300° C. at 760 mm. Hg of pressure. The industrial oils which are solvents for vanillin and which are non-volatile with steam are well known and may be easily determined. In addition, other solvents for vanillin which are practically non-distillable, such as polyethylene oxides, may also be used to great advantage. These practical non-volatile substances work in this manner, that they prevent the formation of lumps and incrustations with inclusions of vanillin in the distillation vessel, moreover the substances prevent the resinification of the residue non-volatile with steam and make so incomparably easier the cleaning of the apparatus. Further advantages are mentioned above.

As stated previously it is possible to use instead of a solvent for the vanillin which is non-volatile with steam a solvent which is volatile with steam. Such substances include liquid aliphatic saturated hydrocarbons aromatic or hydrogenated hydrocarbons or other substituted derivatives having a relatively low boiling point. Substances of this type are also easily obtainable industrially. They operate by facilitating the removing of the impurities volatile with steam.

In many cases the vanillin after extraction from the waste sulfite liquors and the like is found in the form of metallic salts which are non-volatile with steam. This occurs for example when the liquor is treated with caustic alkali, acidified to a pH of 9.0–10.5 and then extracted with an organic solvent of the higher aliphatic alcohol type such as n- or tert-butyl alcohol, cyclohexanol and the like. In such event, the metallic salts must be decomposed before or during the distillation with the steam, and this is accomplished by the addition of an acid to the extractives mass. Preferably the acid used is volatile with steam, for example formic acid, acetic acid, hydrochloric acid and the like. At a temperature of 100–112° C. the impurities then pass over, while in the range of 125–145° C. (up to 160° C. when using polyethylene oxides as solvents) pure vanillin is obtained.

In special cases, however, hot steam distillation of the metallic salts is recommended, during which only certain neutral partners of the recovered solvent extracts, for example, totally alkalized phenols, hydrocarbon-containing compounds, or similar products, pass over.

Gaseous, liquid, or solid compounds, for example, air nitrobenzene, m-nitrobenzene-sulphonic acid, various metallic salts of readily changing valency, and so on, can be used as oxidizing agents having a mild action.

Instead of the solvent extracts mentioned above, materials previously purified by sublimation, recrystallization distillation at normal or reduced pressure with or without added distillation aid, or by way of bisulfite compounds, and so on, may be used. Further, it is, of course, also possible to divide the one working operation described into several part operations and at the same time adapt the sequence or the choice of the individual steps of the process to the raw material concerned.

If the reaction is properly carried out, a preparation which is pure at melting point and which satisfies the purity standards of the German Dispensatory, 6th edition, is crystallized on cooling from the distillates obtained at 120–145° C. If, however, the vanillin does not yet attain the required degree of purity, for example, through an oversight, then it can be refined relatively easily by the usual methods.

The non-volatile constituents are worked up to recover the substances contained in them by known methods.

The novel features which are considered as characteristic for the invention are set forth in particular in the appended claims. The invention itself, however, together with additional objects and advantages thereof, will be best understood from the following description of the accompanying drawing of a flow-sheet illustrating the steps of the method of the present invention.

As may be seen from the flow-sheet, a waste sulphite liquor is subjected to oxidation whereby a mixture of relatively simple compounds including vanillin and impurities is formed. This mixture of compounds is extracted with a solvent to form an extract solution including vanillin and impurities. The solvent is then evaporated leaving a mixture including vanillin and impurities. This mixture is then mixed with a liquid organic substance which is either (1) a good solvent for the vanillin and non-volatile with steam, or (2) a poor solvent for vanillin and easily volatile with steam. The thus-formed mixture is then subjected to fractional steam distillation, preferably in the presence of a mild oxidizing agent, to form a steam distillation fraction which contains vanillin and which is substantially free of impurities. It is then a simple matter to recover substantially pure vanillin from the steam distillation fraction.

The following examples are given to further illustrate the process of the present invention, the scope of the invention, not however being limited to the specific details of the examples.

*Example 1*

500 parts of nitrobenzene are dissolved with 500 parts of the residue of a solvent extract from a waste sulfite liquor in 125 parts of polyethylene oxide (molecular weight 1500) and fractionally distilled with superheated steam. At 100–110° the nitrobenzene is driven off in the course of about 4 hours and then distillation is continued at 100–115° until the various distillates run off without odor. From then on the temperature is raised to more than 120° and pure vanillin is obtained with a yield of 88.4%. The distillation residue is removed from the distillation vessel while still hot and passed on for further working up.

*Example 2*

300 parts of the residue of a solvent extract are fractionally steam-distilled with 300 parts of a gear oil produced by Shell. To drive off the impurities, a first running of 2500 parts of water is necessary. Then the process is continued as described in Example 1. The yield amounts to 80.8% of vanillin.

Example 3

500 parts of the residue of a solvent extract in the form of the sodium salt are steam-distilled at 100–130°. After collecting 3000 parts of distillates, the remainder runs off pure. The contents of the distilling flask are mixed with an excess of HCl and a spindle oil produced by Shell (300 parts). From the distillates obtained at 125–148° pure vanillin is obtained with a yield of 78%.

Example 4

150 parts of the residue of a solvent extract containing relatively little vanillin are mixed with the same quantity of triphenyl methane and steam-distilled. The 77 parts of vanillin obtained in this way are mixed with m-nitrobenzene sulphonic acid for further refining and subjected to a second steam-distillation. The non-volatile ingredients are further worked up to recover the substances contained therein.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process of obtaining vanillin from a mass containing the same and also containing impurities, comprising the steps of steam distilling a mixture comprising said mass containing vanillin and impurities and a liquid organic substance having a predetermined volatility value and a predetermined dissolving ability value for vanillin, one of said predetermined values being very low and the other of said predetermined values being very high, whereby a steam distillation fraction containing vanillin and being substantially free of impurities is formed; and recovering said vanillin-containing fraction.

2. A process of obtaining vanillin from a mass containing the same and also containing impurites, comprising the steps of steam distilling a mixture comprising said mass containing vanillin and impurities and a liquid organic substance having a predetermined volatility value and a predetermined dissolving ability value for vanillin, one of said predetermined values being very low and the other of said predetermined values being very high, in the presence of a mild oxidizing agent, whereby a steam distillation fraction containing vanillin and being substantially free of impurities is formed; and recovering said vanillin-containing fraction.

3. A process of obtaining vanillin from a mass containing the same and also containing impurities, comprising the steps of steam distilling a mixture comprising said mass containing vanillin and impurities and a liquid organic substance being substantially non-volatile with the steam and being a solvent for said vanillin, in the presence of a mild oxidizing agent, whereby a steam distillation fraction containing vanillin and being substantially free of impurities is formed; and recovering said vanillin-containing fraction.

4. A process of obtaining vanillin from a mass containing the same and also containing impurities, comprising the steps of steam distilling a mixture comprising said mass containing vanillin and impurities and a liquid organic substance being volatile with the steam and in which said vanillin is substantially insoluble, in the presence of a mild oxidizing agent, whereby a steam distillation fraction containing vanillin and being substantially free of impurities is formed; and recovering said vanillin-containing fraction.

5. A process of obtaining vanillin from a mass containing the same and also containing impurities, comprising the steps of steam distilling a mixture comprising said mass containing vanillin and impurities and a liquid organic substance being substantially non-volatile with the steam and being a solvent for said vanillin, in the presence of nitrobenzene as mild oxidizing agent, whereby a steam distillation fraction containing vanillin and being substantially free of impurities is formed; and recovering said vanillin-containing fraction.

6. A process of obtaining vanillin from a mass containing the same and also containing impurities, comprising the steps of steam distilling a mixture comprising said mass containing vanillin and impurities and a liquid organic substance being volatile with the steam and in which said vanillin is substantially insoluble, in the presence of nitrobenzene as mild oxidizing agent, whereby a steam distillation fraction containing vanillin and being substantially free of impurities is formed; and recovering said vanillin-containing fraction.

7. A process of obtaining vanillin from a mass containing the same and also containing impurities, comprising the steps of converting a waste sulfite liquor into a reaction mixture of relatively simple compounds including vanillin; extracting said vanillin from said reaction mixture by means of a solvent for said vanillin whereby an extract solution containing vanillin and impurities is formed; evaporating said solvent, thereby obtaining an extract mass containing vanillin and impurities; steam distilling said extract mass in the presence of a liquid organic substance having a predetermined volatility value and a predetermined dissolving ability value for vanillin, one of said predetermined values being very low and the other of said predetermined values being very high, and in the further presence of a mild oxidizing agent, whereby a steam distillation fraction containing vanillin and being substantially free of impurities is formed; and recovering said vanillin-containing fraction.

8. A process of obtaining vanillin from a mass containing the same and also containing impurities, comprising the steps of converting a waste sulfite liquor into a reaction mixture of relatively simple compounds including vanillin; extracting said vanillin from said reaction mixture by means of a solvent for said vanillin whereby an extract solution containing vanillin and impurities is formed; evaporating said solvent, thereby obtaining an extract mass containing vanillin and impurities; steam distilling said extract mass in the presence of a liquid organic substance being substantially non-volatile with the steam and being a solvent for said vanillin and in the further presence of a mild oxidizing agent, whereby a steam distillation fraction containing vanillin and being substantially free of impurities is formed; and recovering said vanillin-containing fraction.

9. A process of obtaining vanillin from a mass containing the same and also containing impurities, comprising the steps of converting a waste sulfite liquor into a reaction mixture of relatively simple compounds including vanillin; extracting said vanillin from said reaction mixture by means of a solvent for said vanillin whereby an extract solution containing vanillin and impurities is formed; evaporating said solvent, thereby obtaining an extract mass containing vanillin and impurities; steam distilling said extract mass in the presence of a liquid organic substance being volatile with the steam and in which said vanillin is substantially insoluble and in the further presence of a mild oxidizing agent, whereby a steam distillation fraction containing vanillin and being substantially free of impurities is formed; and recovering said vanillin-containing fraction.

10. A process of obtaining vanillin from a mass containing vanillin in the form of metallic salts thereof and also containing impurities, comprising the steps of treating said mass with an acid so as to decompose said metallic salts of said vanillin into vanillin, thereby forming a mass containing vanillin and impurities; steam distilling a mixture comprising said mass containing vanillin and impurities and a liquid organic substance having a predetermined volatility value and a predetermined dissolving ability value for vanillin, one of said predetermined values being very low and the other of said predetermined values being very high, in the presence of a mild oxidizing agent, whereby a steam distillation fraction containing vanillin and being substantially free of impurities is formed; and recovering said vanillin-containing fraction.

11. A process of obtaining vanillin from a mass containing vanillin in the form of metallic salts thereof and also containing impurities, comprising the steps of steam distilling a mixture comprising said mass, an acid and a liquid organic substance having a predetermined volatility value and a predetermined dissolving ability value for vanillin, one of said predetermined values being very low and the other of said predetermined values being very high, in the presence of a mild oxidizing agent, whereby a steam distillation fraction containing vanillin and being substantially free of impurities is formed; and recovering said vanillin-containing fraction.

12. A process of obtaining vanillin from a mass containing vanillin in the form of metallic salts thereof and also containing impurities, comprising the steps of steam distilling a mixture comprising said mass, a volatile acid and a liquid organic substance having a predetermined volatility value and a predetermined dissolving ability value for vanillin, one of said predetermined values being very low and the other of said predetermined values being very high, in the presence of a mild oxidizing agent, whereby a steam distillation fraction containing vanillin and being substantially free of impurities is formed; and recovering said vanillin-containing fraction.

13. A process of obtaining vanillin from a mass containing vanillin in the form of metallic salts thereof and also containing impurities, comprising the steps of steam distilling a mixture comprising said mass, a volatile acid selected from the group consisting of formic acid, acetic acid and hydrochloric acid and a liquid organic substance having a predetermined volatility value and a predetermined dissolving ability value for vanillin, one of said predetermined values being very low and the other of said predetermined values being very high, in the presence of a mild oxidizing agent, whereby a steam distillation fraction containing vanillin and being substantially free of impurities is formed; and recovering said vanillin-containing fraction.

14. A process of obtaining vanillin from an alkaline mass containing the same and also containing impurities, comprising the steps of neutralizing said mass with acid and steam distilling a mixture comprising said mass containing vanillin and impurities and a liquid organic substance having a predetermined volatility value and a predetermined dissolving ability value for vanillin, one of said predetermined values being very low and the other of said predetermined values being very high, in the presence of a mild oxidizing agent, whereby a steam distillation fraction containing vanillin and being substantially free of impurities is formed; and recovering said vanillin-containing fraction.

15. A process of obtaining vanillin from an alkaline mass containing the same and also containing impurities, comprising the steps of steam distilling a mixture comprising said mass containing vanillin and impurities and a liquid organic substance having a predetermined volatility value and a predetermined dissolving ability value for vanillin, one of said predetermined values being very low and the other of said predetermined values being very high, in the presence of a mild oxidizing agent, whereby a steam distillation fraction containing vanillin and being substantially free of impurities is formed; neutralizing said mass with acid after starting said steam distillation and before completion thereof; and recovering said vanillin-containing fraction.

References Cited in the file of this patent

UNITED STATES PATENTS 2,506,540   Bryan _____ May 2, 1950